(12) United States Patent
Bae et al.

(10) Patent No.: US 7,785,749 B2
(45) Date of Patent: Aug. 31, 2010

(54) MANUFACTURING METHOD OF ANODE FOR SOLID OXIDE FUEL CELL

(75) Inventors: Joongmyeon Bae, Daejeon (KR); Seung-Wook Baek, Gyeongsangnam-do (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 337 days.

(21) Appl. No.: 11/943,478

(22) Filed: Nov. 20, 2007

(65) Prior Publication Data
US 2009/0023030 A1 Jan. 22, 2009

(30) Foreign Application Priority Data
Jul. 20, 2007 (KR) .................. 10-2007-0072543

(51) Int. Cl.
H01M 4/86 (2006.01)
H01M 4/90 (2006.01)
H01M 8/12 (2006.01)
B32B 37/00 (2006.01)

(52) U.S. Cl. .............. 429/486; 429/495; 429/533; 429/535; 156/60; 156/252; 216/94

(58) Field of Classification Search ............ 429/12–46; 156/60, 252; 216/94
See application file for complete search history.

(56) References Cited

U.S. PATENT DOCUMENTS

| 4,342,632 | A | * | 8/1982 | Heim et al. .............. 204/192.3 |
|---|---|---|---|---|
| 5,256,499 | A | * | 10/1993 | Minh et al. .................... 429/33 |
| 5,866,275 | A | * | 2/1999 | Kawasaki et al. ............. 429/30 |
| 2002/0164523 | A1 | * | 11/2002 | Shibata et al. ................. 429/44 |
| 2004/0121222 | A1 | * | 6/2004 | Sarkar et al. .................. 429/45 |
| 2005/0181253 | A1 | * | 8/2005 | Finnerty et al. ............... 429/30 |
| 2009/0035636 | A1 | * | 2/2009 | Bae et al. ....................... 429/30 |
| 2009/0035637 | A1 | * | 2/2009 | Bae et al. ....................... 429/30 |

OTHER PUBLICATIONS

Lin et al, Microstructure Refinement of Sintered Alumina by a Two-Step Sintering Technique, Sep. 1997, J. Am. Ceram. Soc., vol. 80, pp. 229-2277.*

* cited by examiner

*Primary Examiner*—Basia Ridley
*Assistant Examiner*—Jonathan G Leong
(74) *Attorney, Agent, or Firm*—The Webb Law Firm

(57) ABSTRACT

The present invention relates to a manufacturing method of an anode for a solid oxide fuel cell (SOFC), an anode, and a SOFC, in which an anode is formed by stacking sheets having a plurality of holes, and the holes are used as gas diffusion paths through which fuel gas can be facilely diffused, and some of the holes are filled with a reinforcement member or a current collecting member, thereby improving a cell strength and increasing a current collecting performance and thus an efficiency of the SOFC.

9 Claims, 7 Drawing Sheets

MANUFACTURING METHOD OF ANODE FOR SOLID OXIDE FUEL CELL

TECHNICAL FIELD

The present invention relates to a manufacturing method of an anode for a solid oxide fuel cell (SOFC), an anode, and a SOFC, and more particularly, to a manufacturing method of an anode for a solid oxide fuel cell (SOFC), an anode, and a SOFC, in which an anode is formed by stacking sheets having a plurality of holes, and the holes are used as gas diffusion paths through which fuel gas can be facilely diffused, and some of the holes are filled with a reinforcement member or a current collecting member, thereby improving a cell strength and increasing a current collecting performance and thus an efficiency of the SOFC.

BACKGROUND ART

A fuel cell, which directly converts chemical energy generated by oxidation into electrical energy, is a new green futuristic energy technology which can generates the electrical energy from materials such as oxygen, hydrogen and the like which is found in abundance on the earth.

In the fuel cell, oxygen is supplied to a cathode and hydrogen is supplied to an anode so that an electrochemical reaction is performed in a reverse way of water electrolysis so as to generate electricity, head and water, thereby producing the electrical energy without any contamination.

Since the fuel cell is free from limitation of Carnot cycle efficiency which acts as the limitation in a conventional heat engine, it is possible to increase an efficiency of 40% or more. Further, since only the water is exhausted as emissions, there is not a risk of environmental pollution. Furthermore, since there is not a necessity of a place for mechanical motion, unlike in the conventional heat engine, it has some advantages of reducing a size and a noise. Therefore, the fuel cell technologies (e.g. material, fabrication, etc) are actively investigated at many famous laboratories all over the world at present.

According to a kind of electrolyte used therein, the fuel cell is classified into a PAFC (Phosphoric Acid Fuel Cell), a MCFC (Molten Carbonate Fuel Cell), a SOFC (Solid Oxide Fuel Cell), a PEMFC (Polymer Electrolyte Membrane Fuel Cell), a DMFC (Direct Methanol Fuel Cell) and an AFC (Alkaline Fuel Cell) which are already being used or developed. Characteristics thereof will be described in a table.

|  | PAFC | MCFC | SOFC | PEMFC | DMFC | AFC |
|---|---|---|---|---|---|---|
| Electrolyte | Phosphoric acid | Lithium carbonate/ Potassium carbonate | Zirconia/ Ceria series | Hydrogen ion exchange membrane | Hydrogen ion exchange membrane | Potassium hydroxide |
| Ion conductor | Hydrogen ion | Carbonic acid ion | Oxygen ion | Hydrogen ion | Hydrogen ion | Hydrogen ion |
| Operation temperature | 200 | 650 | 500~1000 | <100 | <100 | <100 |
| Fuel | Hydrogen | Hydrogen, carbon monoxide | Hydrogen, hydrocarbon, carbon monoxide | Hydrogen | methanol | Hydrogen |
| Raw material of fuel | City gas, LPG | City gas, LPG, coal | City gas, LPG, Hydrogen | Methanol, Methane gasoline, Hydrogen | methanol | Hydrogen |
| Efficiency (%) | 40 | 45 | 45 | 45 | 30 | 40 |
| Range of output power (W) | 100-5000 | 1000-1000000 | 100-100000 | 1-10000 | 1-100 | 1-100 |
| Application | Distributed power generation | Large scale power generation | Small, middle and large scale power generation | Power source for transport | Portable power source | Power source for space ship |
| Development level | Demonstrated-utilized | Tested-demonstrated | Tested-demonstrated | Tested-demonstrated | Tested-demonstrated | Applied to space ship |

As described in the table, the fuel cells have various ranges of output power and applications and the like. Thus, a user can selectively use one of the fuel cells for various purposes. Particularly, the SOFC has a disadvantage that its operation temperature is high, but also has an advantage that it can be used for large scale power generation.

In an operation principle of the SOFC, oxygen is supplied to the cathode and hydrogen is supplied to an anode. At this time, the reaction is performed as follows:

Reaction in the anode

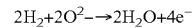

Reaction in the cathode

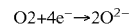

In the SOFC having the characteristic described above, the higher the diffusion performance of the hydrogen supplied to the anode is, the more an efficiency of the fuel cell is increased. Therefore, in order to increase the diffusion performance of the hydrogen supplied to the anode, a gas diffusion layer is formed by artificially adding an additive like polymer or carbon.

In case that the conventional SOFC has a gas diffusion part, strength of the SOFC is reduced. But if a thickness of the anode is increased in order to solve the problem, gas diffusion is deteriorated, and thus a performance of the fuel cell is also deteriorated. Particularly, the performance of the fuel cell is damaged in a high current range.

Further, according as the reaction is processed, a gas diffusion path is clogged by carbon deposition. Thus, fuel supplying to a catalytic layer contacted with an electrolyte layer is blocked. Since it makes difficult to collect current generated from the anode, there is a problem of electric power loss.

Meanwhile, in fabricating of the SOFC, a powder compressing method has a disadvantage that cracks are easily generated by a small pressure since a density in an entire area, thereby shortening a lifetime thereof and also deteriorating a fuel cell performance.

DISCLOSURE OF THE INVENTION

It is an object of the present invention to provide a manufacturing method of an anode for a solid oxide fuel cell (SOFC), an anode, and a SOFC, in which an anode is formed by stacking sheets having a plurality of holes so as to increase a diffusion performance of fuel gas, thereby increasing the fuel cell performance, and also the density of the anode is thus uniformed, thereby increasing the lifetime thereof.

It is another object of the present invention to provide a manufacturing method of an anode for a solid oxide fuel cell (SOFC), an anode, and a SOFC, in which some of the holes are filled with the reinforcement member or the current collecting member, thereby minimizing a current collecting resistance and thus maximizing a current collecting performance as well as improving a strength of the anode.

To achieve the object, there is provided a fabricating method of an anode (fuel electrode) 20 for a solid oxide fuel cell (SOFC) 100 which comprises an electrolyte layer 10; and an anode 20 and a cathode 30 are formed to be contacted with both surfaces of the electrolyte layer 10, comprising the steps of a) preparing a plurality of sheets S forming the anode 20; b) forming holes H in each sheet S; c) forming a first layer 21 by providing a sheet, in which the holes H are not formed, at an uppermost side, and forming a second layer 22 by stacking the plurality of sheets S, in which the holes H are formed at each sheet, at a lower side of the first layer 21 so that the holes H formed in the sheets S are is communicated with each other; and d) sintering the stacked sheets.

Preferably, the holes H formed in the stacked sheets S are forming a gas diffusion path 23, and the holes H formed in the stacked sheets S are forming a reinforcement part 24, and the holes H formed in the stacked sheets S are forming a current collecting part 26.

Preferably, there is further provided a step of e) improving an adhesive force between the stacked sheets S between the c) sheet stacking step and the d) sintering step, and the e) step of improving the adhesive force is performed by a WIP (Warm Isostatic Process), a CIP (Cold Isostatic Process) or a pressing process.

Preferably, there is further provided a step of f) filling each material in some of the holes H of the sheets S between the b) holes H forming step and the c) sheet stacking step, and the holes H are kept empty or filled with a polymer material or carbon which is burned out, and the holes H forming the reinforcement part 24 and the current collecting part 26 are respectively filled with a reinforcement member 25 for improving a strength of the anode 20 and a current collecting member 27 for improving a current collecting efficiency.

Preferably, there is further provided a step of g) forming a current collecting layer 28 connected with the current collecting member 27 at an outside of an lowermost sheet S, and the current collecting layer 28 is formed by a metalizing method in the g) step, and the reinforcement member 25 and the current collecting member 27 are formed of Ni, Ce-based oxide, YSZ-based oxide or a mixture of the same.

Preferably, there is further provided a step of h) inserting an integrally formed reinforcement member 25 or current collecting member 27 in the reinforcement part 24 and the current collecting part 26 between the c) stacking step and the e) step of improving the adhesive force.

Preferably, the sheet S is formed of YSZ (Yttria Stabilized Zirconia), ce-based oxide, NiO, pore forming agent or a mixture of thereof in the a) sheet preparing step, and the sheets S have a thickness of 10 to 1000 μm, and the c) sheet stacking step used a temperature, pressure or adhesive agent.

Preferably, the holes H are formed by either mechanical punching, laser punching or x-ray lithography in the b) step, and the holes H have a diameter of 1000 μm and less.

Preferably, in the d) sintering step, heat treatment is performed at a first temperature of 400 to 600° C. and then performed again at a second temperature of 800 to 1200° C., and heating time for the heat treatment at the first temperature of 400 to 600° C. is 25 to 35 hours, and the first temperature is maintained for 1 to 3 hours, and heating time for the heat treatment at the second temperature of 800 to 1200° C. is 5 to 7 hours, and the second temperature is maintained for 1 to 3 hours.

Preferably, the anode 20 of the present invention is fabricated by the above fabricating method of the anode (fuel electrode) for the SOFC, and the SOFC comprises the anode 20.

DETAILED DESCRIPTION OF MAIN ELEMENTS

| | | | |
|---|---|---|---|
| Sa~Sh: | each step in fabricating method of SOFC according to the present invention | | |
| 100: | solid oxide fuel cell (SOFC) | | |
| 10: | electrolyte layer | 20: | fuel electrode |
| 21: | first layer | 22: | second layer |
| 23: | gas diffusion path | 24: | reinforcement part |
| 25: | reinforcement member | | |
| 26: | current collecting part | | |
| 27: | current collecting member | | |
| 28: | current collecting layer | | |
| 30: | air electrode | | |
| S: | sheet | H: | hole |

BEST MODE FOR CARRYING OUT THE INVENTION

Practical and presently preferred embodiments of the present invention are illustrative with reference to the accompanied drawings.

Figure 1:
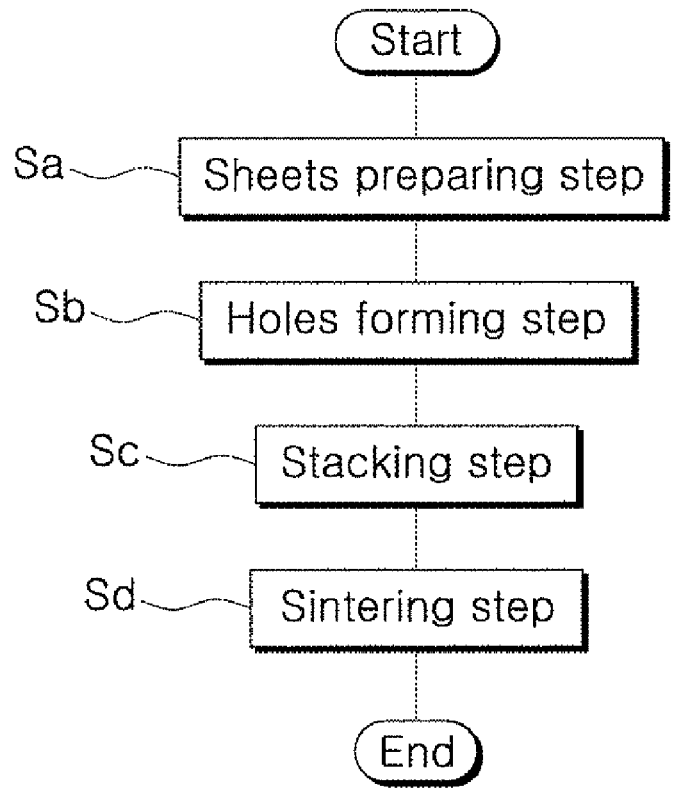
FIG. 1 is a block diagram showing a fabricating method of a fuel cell for a solid oxide fuel cell (SOFC) according to the present invention.

FIG. 1 is a block diagram showing a fabricating method of a fuel cell 20 for a solid oxide fuel cell (SOFC) according to the present invention. The fabricating method includes a) a step Sa of forming a sheet S; b) a step Sb of forming holes H; c) a stacking step Sc; and d) a sintering step Sd.

The SOFC 100 of the present invention includes an electrolyte layer 10; and an anode 20 and a cathode 30 are formed to be contacted with both surfaces of the electrolyte layer 10.

The fabricating method of the anode 20 for the SOFC 100 according to the present invention employs a method of stacking sheets S in which a diffusion performance of hydrogen, strength thereof and a current collecting performance are regulated by using the holes H formed in the sheet H.

In the a) step of forming the sheet S, the sheet S which is a basic material for fabricating the anode 20 of the SOFC 100 is formed.

The sheet S is formed of Yttria-stabilized zirconia (YSZ), Ce-based oxide, NiO, pore-forming agent and a mixture thereof. Further, the material is prepared so that the sheets S have a proper viscosity and dispensability so as to have the same performance over an entire area, and the step of forming the sheet S includes a drying process.

The pore-forming agent includes carbon or polymer or a mixture thereof.

The sheets S have a thickness of 10~1000 μm, and is provided in plural.

In the b) step of forming the holes H in which the holes H are formed in the prepared sheet S, the holes H having a predetermined pattern is formed at a part of the sheet S.

After the sheets S are stacked, the holes H form a gas diffusion path 23, a reinforcement part 24 or a current collecting part 26.

Preferably, the holes H formed in the anode 20 has a diameter of 1000 μm and less so that the fuel gas can be facilely diffused and also a proper strength thereof can be maintained. In the b) step of forming the holes H, the holes H is formed by one of mechanical punching, laser punching or X-ray lithography.

In the c) stacking step Sc, the sheet S which has not the holes H are provided as a first layer 21 at an uppermost side, and the plurality of sheets S having the holes H are stacked as a second layer 22 at a lower side of the first layer so that the holes H formed in the sheets H are communicated with each other.

The first layer 21 is formed by using one sheet S to be as thin as possible. And in the second layer 22, the holes H formed in the sheets H are communicated with each other to form a gas diffusion path 23, so that a reaction due to a three-phase boundary is occurred directly and rapidly at a portion adjacent to an electrolyte, thereby reducing a partial pressure of the fuel gas in the cell and also reducing a diffusion resistance of the fuel gas and thus obtaining a high performance even in the lower partial pressure of the fuel gas.

In the c) stacking step Sc, if necessary, a predetermined temperature or pressure may be applied, and an adhesive agent like ceramic slurry may be also used.

In the d) sintering step Sd in which the stacked sheets S are sintered so as to complete the fabrication process of the anode 20, a first heat treatment is performed at a temperature of 400 to 600° C., and then a second heat treatment is performed at a temperature of 800 to 1200° C. Heating time for the first heat treatment at the temperature of 400 to 600° C. is 25 to 35 hours, and the temperature of 400 to 600° C. is maintained for 1 to 3 hours. And heating time for the second heat treatment at the temperature of 800 to 1200° C. is 5 to 7 hours, and the temperature of 800 to 1200° C. is maintained for 1 to 3 hours.

That is, the d) sintering step Sd includes a first step that the temperature is gradually raised to 400 to 600° C. for 25 to 35 hours and then maintained for 1 to 3 hours, and a second step that the temperature is gradually raised to 800 to 1200° C. for 5 to 75 hours and then maintained for 1 to 3 hours.

In addition, the sintering process may be performed differently according to kinds and characteristics of the cathode 30, the electrolyte layer 10 and the anode 20.

Furthermore, the fabricating method of the anode 20 for the SOFC according to the present invention may further include a e) step Se of improving an adhesive force between the c) stacking step and the d) sintering step.

In the step of e) which strengthens the adhesive force between the sheets S before the sintering step, the e) step Se may be performed by a WIP (Warm Isostatic Process), a CIP (Cold Isostatic Process) or a pressing process, and head may be also applied during the pressing process.

Figure 2:
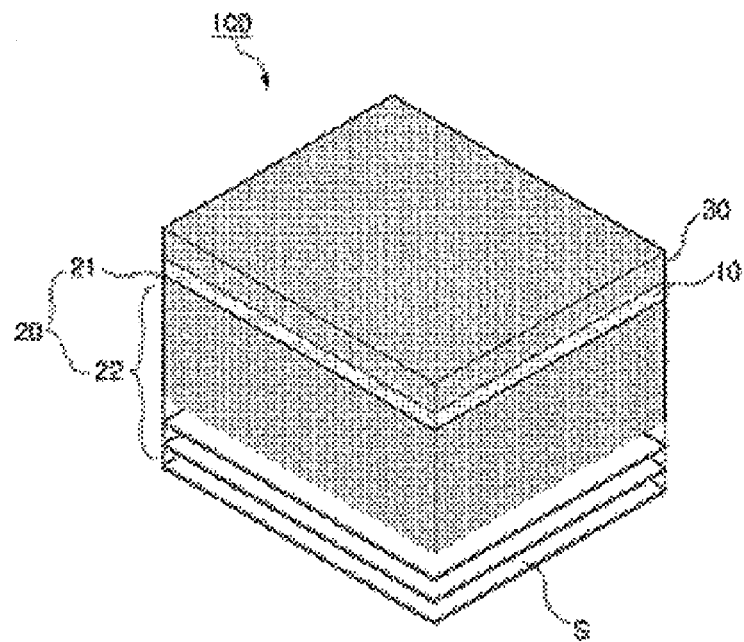
FIG. 2 is a perspective view of an example of a SOFC fabricated by the method according to the present invention.
Figure 3A:
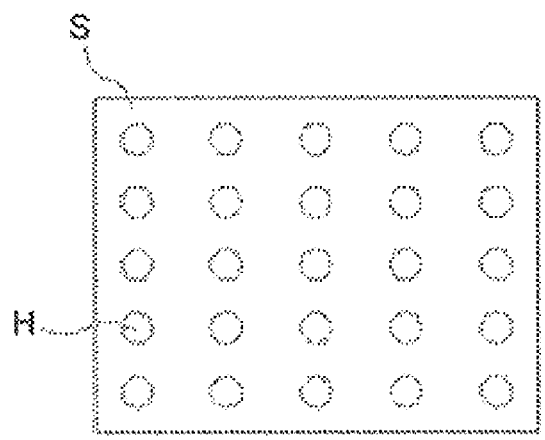
FIG. 3 is a view of a sheet fabricated by the method according to the present invention.
Figure 3B:
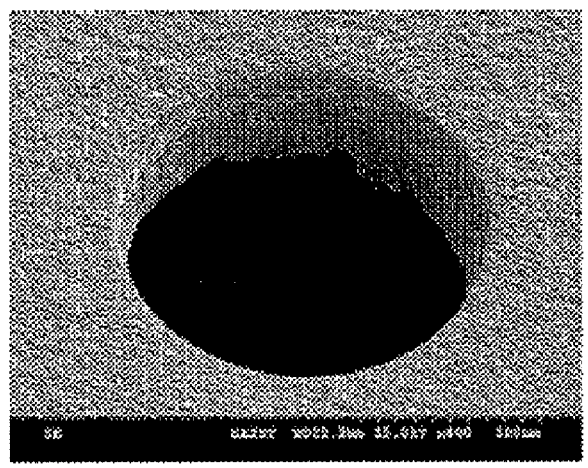

FIG. 2 is a perspective view of an example of a SOFC fabricated by the method according to the present invention, FIG. 3a is a view of a sheet fabricated by the method according to the present invention, and FIG. 3b is a photograph showing the hole punched in the sheet S. As shown in FIG. 2, the anode 20 is formed by stacking the plurality of sheets S in which the holes H are formed as shown in FIGS. 3a and 3b.

Figure 4A:
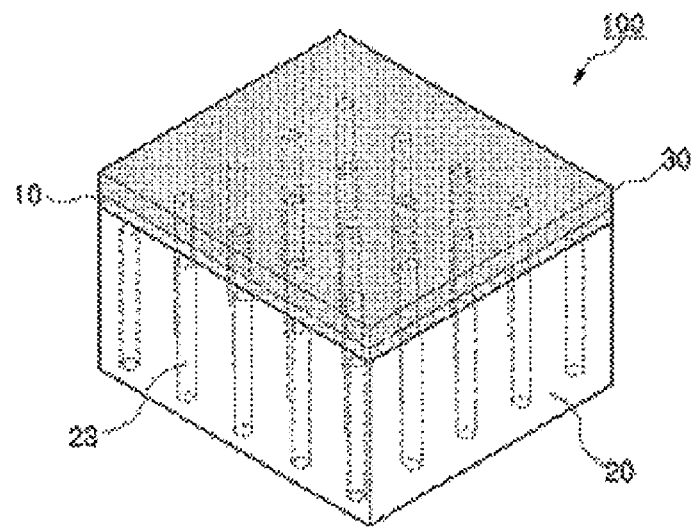
FIG. 4a is a perspective view of a SOFC according to the present invention.
Figure 5:
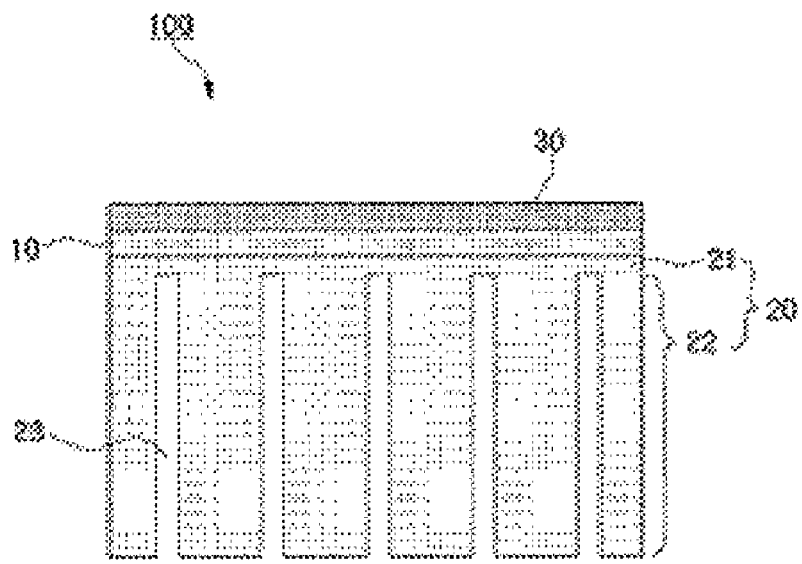
FIG. 5 is a cross-sectional view of the SOFC of FIG. 3.

FIG. 4a is a perspective view of a SOFC according to the present invention, and FIG. 5 is a cross-sectional view of the SOFC of FIG. 3, wherein the sheets S are stacked so that the holes H formed in the sheets S are communicated with each other to form the gas diffusion path 23.

Figure 4B:
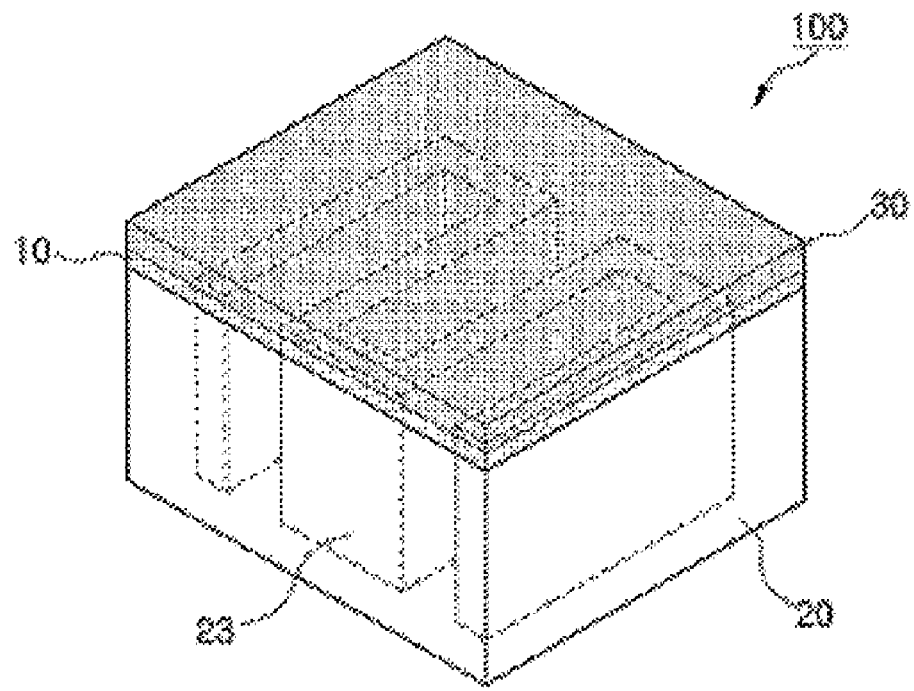
FIG. 4b is a perspective view of another SOFC according to the present invention.

FIG. 4b is a perspective view of another SOFC according to the present invention. As shown in FIG. 4b, the gas diffusion path 23 may be formed into a channel type, and the holes H may have various shapes.

The gas diffusion path is communicated with the outside so that the fuel gas can be facilely moved, and an additional holes H are provided as the reinforcement part 24 to reinforce a lowered strength due to formation of the gas diffusion path 23, and an addition holes H are further provided the current collecting part 26 to improve the current collecting efficiency.

Figure 6:
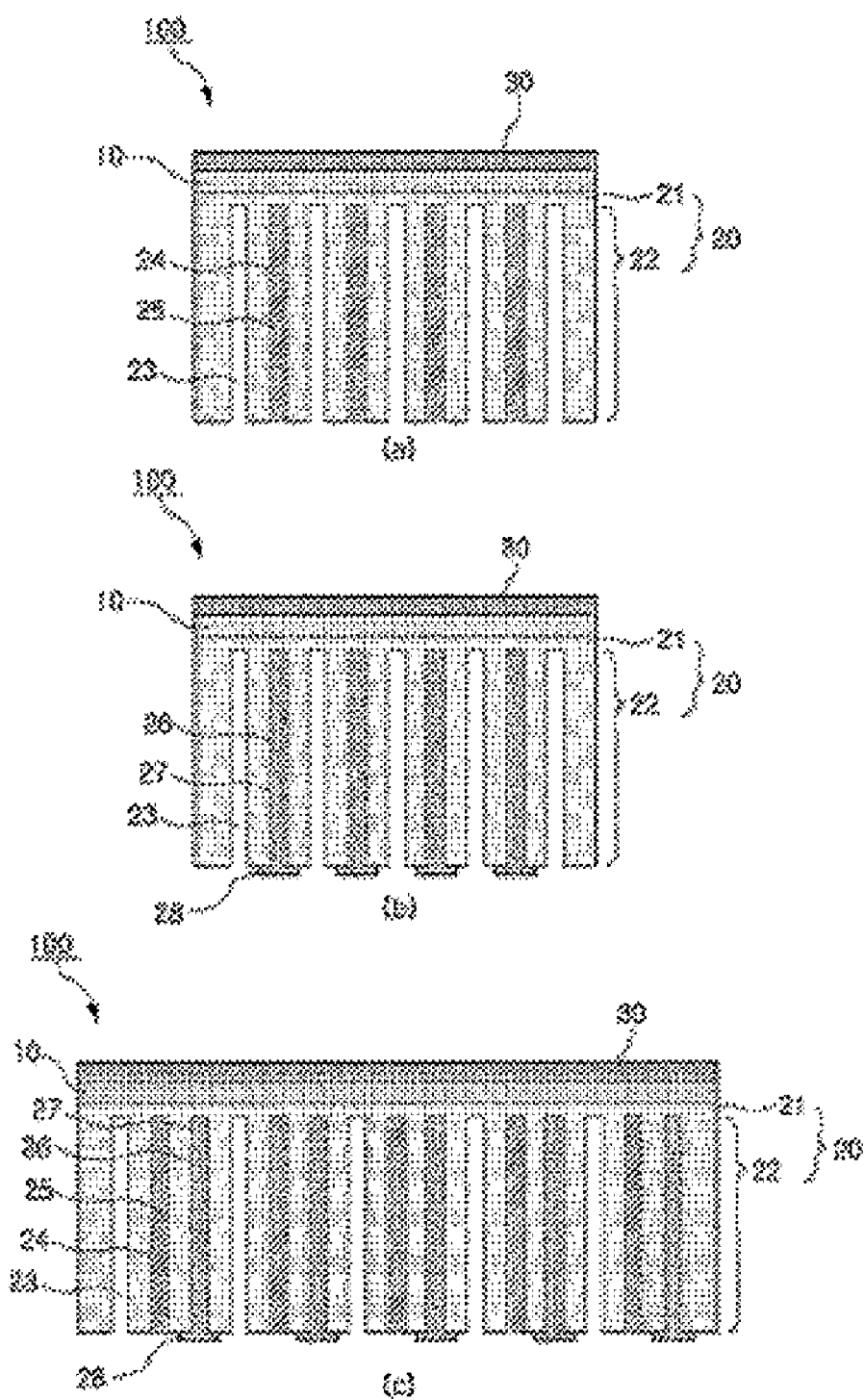
FIG. 6 is a cross-sectional view of the SOFC according to another embodiment of the present invention.

FIG. 6 is a cross-sectional view of another SOFC according to the present invention. Herein, FIG. 6a shows an example that the gas diffusion path 23 and the reinforcement part 24 are formed and the reinforcement member 25 is formed in the reinforcement part 24, and FIG. 6b shows an example that the gas diffusion path 23 and the current collecting part 26 are formed, the current collecting member 27 is formed in the current collecting part 26 and a current collecting layer 28 is formed at a lowermost sheet S so as to be connected with the current collecting member 27.

A method of forming the reinforcement member 25 and the current collecting member 27 into the reinforcement part 24 and the current collecting part 26 can be divided into two types, and a first method thereof will be described with reference to FIG. 7.

Figure 7:
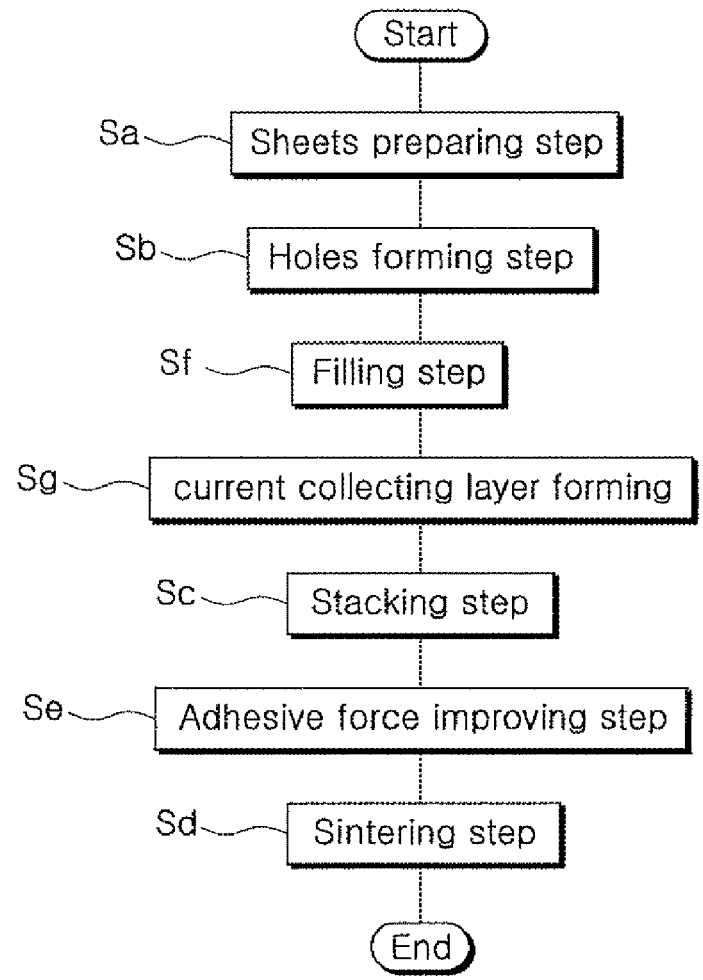
FIG. 7 is a block diagram showing another fabricating method of the fuel cell for the SOFC according to the present invention.

FIG. 7 is a block diagram showing another fabricating method of the fuel cell for the SOFC according to the present invention, wherein there is further provided a f) step Sf of filling each material in the holes H of the sheets S and a g) step Sg of forming the current collecting layer 28 connected with the current collecting member 27 at an outside of the lowermost sheet S between the b) step Sb of forming the holes H and the c) step Sc of stacking the sheets S.

Since the current collecting in the fuel cell is performed typically by putting a current collector to a lower side of the cell, the g) step Sg forms the current collecting layer 28 to increase a contact surface area with the current collector, thereby further improving the current collecting efficiency.

Moreover, as shown in FIG. 7, the g) step Sg of forming the current collecting layer 28 is performed between the f) filling step Sf and the c) stacking step Sc. However, the current collecting layer 28 may be formed after the c) stacking step Sc or the d) sintering step Sd.

The f) filling step Sf is to fill each of the materials in the holes H according a purpose of the holes H before the c) stacking step Sc.

That is, in case that the holes H are used as the gas diffusion path 23, since the gas diffusion path 23 should be hollowed so that the fuel gas can be moved therethrough, the gas diffusion path 23 may be kept empty or filled with a polymer material or carbon which is burned out.

Further, in case that the holes H are used as the reinforcement part 24 or the current collecting part 26, the reinforcement member 25 for increasing the strength of the anode 20 or the current collecting member 27 for increasing the current collecting efficiency is filled in the holes H. The reinforcement member 25 and the current collecting member 27 are formed of Ni, Ce-based oxide, YSZ-based oxide or a mixture thereof. Preferably, the reinforcement member 25 and the current collecting member 27 are formed of a material having a similar thermal expansion characteristic to the sheet S so as to previously prevent a thermal deformation.

Figure 8:
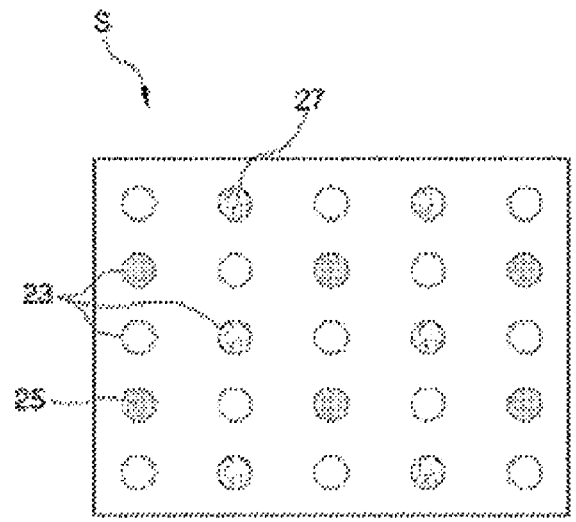
FIG. 8 is a view of another sheet fabricated by the method according to the present invention.

FIG. 8 is a view of another sheet S fabricated by the method according to the present invention, wherein a proper material may be filled in the holes H according to the purpose of the holes H before the c) stacking step Sc. As shown in FIG. 8, the gas diffusion path 23 is kept empty, and the holes H used as the current collecting part 26 is filled with the current collecting member 27, and the holes H used as the reinforcement part 24 is filled with the reinforcement member 25.

Therefore, according to the strength, the diffusion performance of fuel gas and the current collecting performance which are required in the present invention, a diameter of the holes H and the number of the holes H can be changed variously.

Figure 9:
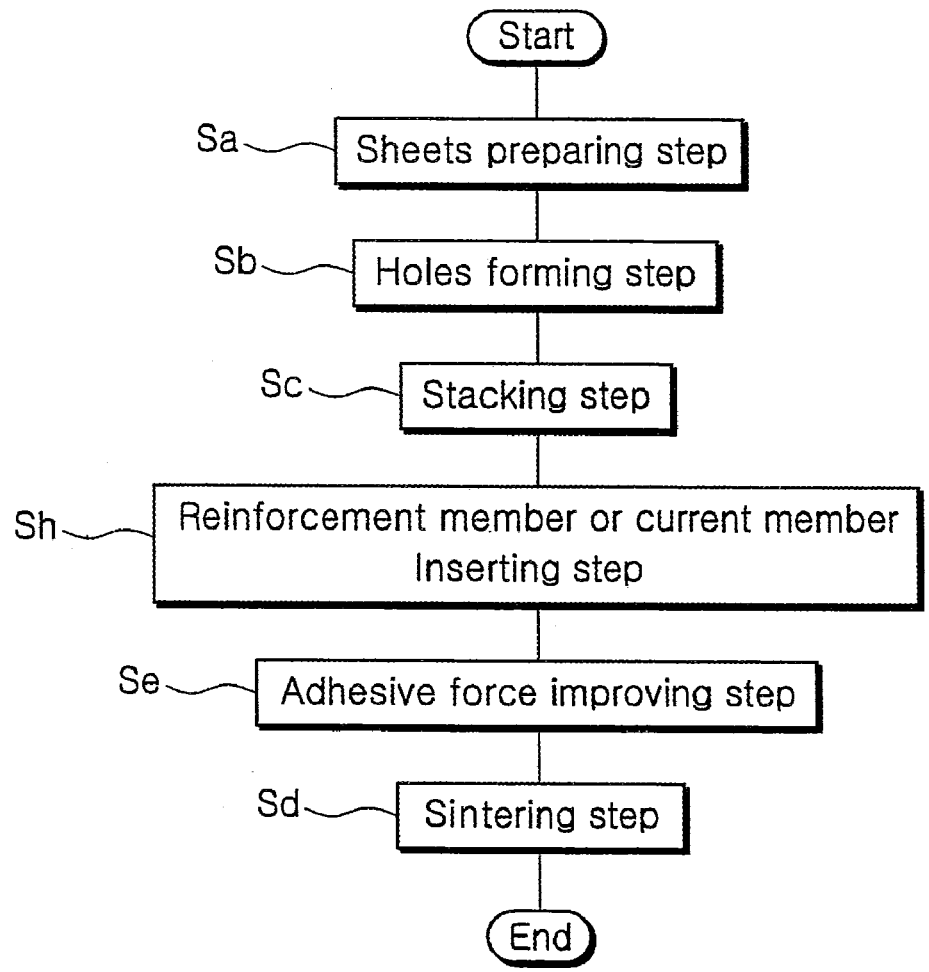
FIG. 9 is a block diagram showing yet another fabricating method of the fuel cell for the SOFC according to the present invention.

FIG. 9 is a block diagram showing yet another fabricating method of the fuel cell 20 for the SOFC according to the present invention, which shows a second method of forming the reinforcement member 25 and the current collecting member 27 into the reinforcement part 24 and the current collecting part 26.

As another method of forming the reinforcement member 25 or the current collecting member 27, there may be further provided a h) step Sh of inserting an integrally formed reinforcement member 25 or current collecting member 27 between the c) stacking step Sc and the e) step Se of improving the adhesive force.

In the h) step Sh of the reinforcement member 25 or current collecting member 27 as shown in FIG. 9, the integrally formed reinforcement member 25 and the current collecting member 27 are respectively inserted in the reinforcement part 24 and the current collecting part 26 formed by stacking the holes H in the sheets H. In comparison with the FIG. 7, this method can simplify the fabricating process by omitting the filling step.

Meanwhile, the SOFC 100 of the present invention is characterized by including the anode 20 fabricated by the fabricating method.

First Embodiment

Fabrication of Fuel Electrode

After a slurry in which 8%-YSZ of 40 g, NiO of 60 g, pore forming agent C of 10 g, binder of 12 g, dispersing agent of 3 g and plasticizer of 10 g are mixed is ball-milled for 30 hour so as to be uniformed, a sheet is formed in a speed of 1 cm/sec by using a tape caster, and then dried for 3 hours, thereby obtaining the sheet having a thickness of 500 μm.

Figure 11:
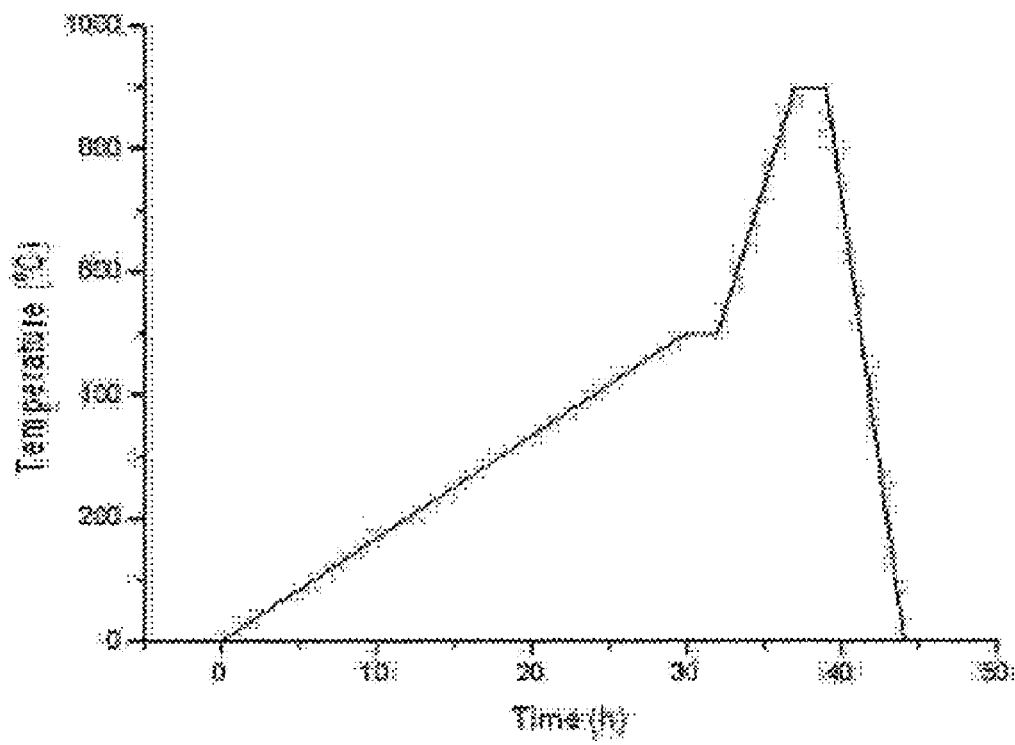
FIG. 11 is a graph of sintering temperature according to the first embodiment of the present invention.

Some of the sheets are formed with holes having a diameter of 150 μm and spaced at a distance of 500 μm, and then, in a state that one sheet in which the holes are not formed is placed at an uppermost side, twenty sheets in which the holes are formed are stacked in turn. At this time, a temperature between two adjacent sheets (i.e., two upper and a lower sheet is kept at 30 to 60° C. and pressed for 10 seconds at a pressure of 100 kgf while each sheet is stacked. In order to further increase an adhesive force between the sheets, the WIP (Warm Isostatic Process) is performed for 10 minutes at 50 to 80° C. and 15 MPa, and then heat treatment is performed according to a temperature profile of FIG. 11. In other words, a temperature for the heat treatment is increased to 500° C. for 30 hours and maintained for 2 hours, and the temperature is increased again to 900° C. for 6 hours and maintained for 2 hours, and then reduced to a room temperature for 10.

After the temperature is increased again to 1500° C. and maintained for 2 hours and then reduced to a room temperature, the stacked sheets are sintered so as to form the anode.

Figure 10:
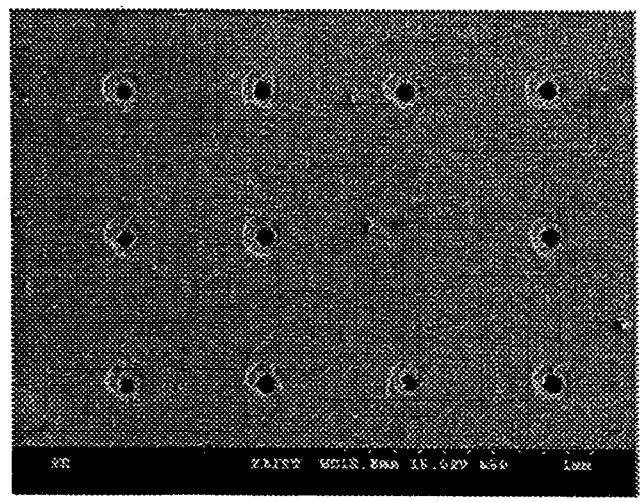
FIG. 10 is an SEM photograph of the anode of the SOFC according to a first embodiment of the present invention.

FIG. 10 is an SEM photograph of the anode of the SOFC according to a first embodiment of the present invention.

INDUSTRIAL APPLICABILITY

According to the SOFC of the present invention, the anode in which the gas diffusion path is formed is formed by using the sheets having the plurality of holes, thereby uniformizing the density of the anode and thus increasing a lifetime thereof. Further, it is possible to improve the diffusion performance of the fuel gas and also to reduce a loss due to the diffusion resistance, thereby improving a performance of the fuel cell. And, it is possible to produce a large quantity of electric power even in the low fuel partial pressure. Furthermore, it is also possible to quickly stabilize the cell and the performance thereof by quickly inducing oxidation-reduction reactions in the anode.

In addition, according to the SOFC of the present invention, some of the holes are filled with the reinforcement member or the current collecting member so as to be used as a reinforcement part or a current collecting part, thereby minimizing a current collecting resistance as well as improving strength of the anode. Further, the strength, the current collecting performance and the diffusion performance of fuel gas can be regulated by controlling the number of holes and a size of the hole.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A fabricating method of an anode (fuel electrode) for a solid oxide fuel cell (SOFC) having an electrolyte layer; and an anode and a cathode formed to be contacted with both surfaces of the electrolyte layer, comprising the steps of:
   a) preparing a plurality of sheets forming the anode;
   b) forming holes in each sheet;
   b1) filling a portion of the holes of the sheets with a polymer material or carbon which is burnt out at a temperature, another portion of the holes with reinforcement member for improving strength of the fuel electrode, and the remaining portion of holes with current collecting member for improving the current collecting efficiency;
   b2) forming a current collecting layer connected with the current collecting member at an outside of a lower most sheet by a metalizing method;
   c) forming a first layer by providing a sheet, in which the holes are not formed, at an uppermost side, and forming a second layer by stacking the plurality of sheets, in which the holes are formed at each sheet, at a lower side of the first layer so that the holes formed in the sheets are communicated with each other;
   c1) improving an adhesive force between the stacked sheets by a warm isostatic process, isostatic process, or a pressing process; and
   d) sintering the stacked sheets
   wherein the holes, by stacking the sheets, form a gas diffusion path, a reinforcement part, and a current collecting part, and the reinforcement member and the current collecting member are formed of a mixture of Ni, at least one Ce-based oxide, and at least one YSZ-based oxide.

2. The fabricating method as set forth in claim 1, wherein, in the a) sheet preparing step, the sheets are formed of YSZ (Yttria Stabilized Zirconia), ce-based oxide, NiO, pore forming agent or a mixture of thereof.

3. The fabricating method as set forth in claim 2, wherein the sheets have a thickness of 10 to 1000 µm.

4. The fabricating method as set forth in claim 3, wherein the c) sheet stacking step uses a temperature, pressure or adhesive agent.

5. The fabricating method as set forth in claim 1, wherein, in the b) step, the holes are formed by either mechanical punching, laser punching or x-ray lithography.

6. The fabricating method as set forth in claim 5, wherein the holes have a diameter of 1000 µm and less.

7. The fabricating method as set forth in claim 1, wherein, in the d) sintering step, heat treatment is performed at a first temperature of 400 to 600° C. and then performed again at a second temperature of 800 to 1200° C.

8. The fabricating method as set forth in claim 7, wherein a heating time for the heat treatment at the first temperature of 400 to 600° C. is 25 to 35 hours, and the first temperature is maintained for 1 to 3 hours.

9. The fabricating method as set forth in claim 8, wherein a heating time for the heat treatment at the second temperature of 800 to 1200° C. is 5 to 7 hours, and the second temperature is maintained for 1 to 3 hours.

* * * * *

UNITED STATES PATENT AND TRADEMARK OFFICE
CERTIFICATE OF CORRECTION

PATENT NO. : 7,785,749 B2  Page 1 of 1
APPLICATION NO. : 11/943478
DATED : August 31, 2010
INVENTOR(S) : Bae et al.

It is certified that error appears in the above-identified patent and that said Letters Patent is hereby corrected as shown below:

Column 10, line 4, Claim 1, "a warm isostatic process, isostatic process," should read
-- a warm isostatic process, a cold isostatic process, --

Signed and Sealed this

Seventh Day of December, 2010

David J. Kappos
*Director of the United States Patent and Trademark Office*